US012803692B2

(12) United States Patent
Cao et al.

(10) Patent No.: US 12,803,692 B2
(45) Date of Patent: Nov. 17, 2026

(54) AUDIO AND VIDEO SYNCHRONIZATION METHOD AND DEVICE, ELECTRONIC DEVICE, AND COMPUTER READABLE STORAGE MEDIUM

(71) Applicant: AMLOGIC (SHANGHAI) CO., LTD., Shanghai (CN)

(72) Inventors: Lifeng Cao, Shanghai (CN); Zhi Zhou, Shanghai (CN); Yunmin Chen, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 313 days.

(21) Appl. No.: 18/632,329

(22) Filed: Apr. 11, 2024

(65) Prior Publication Data

US 2024/0259126 A1 Aug. 1, 2024

Related U.S. Application Data

(63) Continuation of application No. PCT/CN2022/115903, filed on Aug. 30, 2022.

(30) Foreign Application Priority Data

Dec. 31, 2021 (CN) ......................... 202111677757.0

(51) Int. Cl.
*H04J 3/06* (2006.01)
*H04N 21/43* (2011.01)

(52) U.S. Cl.
CPC .......... *H04J 3/0641* (2013.01); *H04J 3/0655* (2013.01); *H04N 21/4307* (2013.01)

(58) Field of Classification Search
CPC ... H04J 3/0641; H04J 3/0655; H04N 21/4307
See application file for complete search history.

(56) References Cited

U.S. PATENT DOCUMENTS 5,202,981 A 4/1993 Shackelford
5,247,669 A 9/1993 Abraham et al.
(Continued)

FOREIGN PATENT DOCUMENTS

CN 1436001 A 8/2003
CN 101887739 A 11/2010
(Continued)

OTHER PUBLICATIONS

International Search Report of PCT Patent Application No. PCT/CN2022/115903 issued on Oct. 27, 2022.
(Continued)

*Primary Examiner* — Duc C Ho

(57) ABSTRACT

An audio and video synchronization method and device for a playback module, an electronic device and a computer-readable storage medium are disclosed. The playback module includes an object-oriented program language standard library and an audio and video synchronization module of a kernel driver. The method includes: determining, in response to a playback instruction, a target player to build an audio module and a video module by the target player; creating, in the program language standard library, a synchronization instance corresponding to the target player, the synchronization instance having a unique instance identifier; and obtaining a reference clock corresponding to a real-time code stream of the synchronization instance based on the instance identifier, and controlling, according to a set synchronization mode, data outputs of the audio module and the video module corresponding to the target player based on the reference clock.

20 Claims, 2 Drawing Sheets

(56) References Cited

U.S. PATENT DOCUMENTS

| | | | | |
|---|---|---|---|---|
| 5,410,702 | A | 4/1995 | Abraham et al. | |
| 5,488,721 | A | 1/1996 | Rich et al. | |
| 6,941,383 | B1 | 9/2005 | Getsin et al. | |
| 10,242,712 | B2 * | 3/2019 | Iwamoto | H04N 9/87 |
| 2005/0289601 | A1 | 12/2005 | Park et al. | |
| 2008/0152309 | A1 * | 6/2008 | Shih | H04N 9/89 386/E9.06 |
| 2015/0066573 | A1 | 3/2015 | Damonte et al. | |
| 2016/0173931 | A1 | 6/2016 | Eber et al. | |
| 2018/0310042 | A1 | 10/2018 | Mayalil et al. | |

FOREIGN PATENT DOCUMENTS

| | | | |
|---|---|---|---|
| CN | 104333808 | A | 2/2015 |
| CN | 104714844 | A | 6/2015 |
| CN | 106354458 | A | 1/2017 |
| CN | 109729404 | A | 5/2019 |
| CN | 111405337 | A | 7/2020 |
| CN | 112153443 | A | 12/2020 |
| EP | 0869443 | B1 | 12/2009 |
| JP | 2001222460 | A | 8/2001 |
| JP | 2006099297 | A | 4/2006 |
| JP | 2007049466 | A | 2/2007 |
| WO | 2011150826 | A1 | 12/2011 |

OTHER PUBLICATIONS

First Office Action of counterpart Chinese Patent Application No. 202111677757.0 issued on Dec. 9, 2022.

Second Office Action of counterpart Chinese Patent Application No. 202111677757.0 issued on May 17, 2023.

Zhenming Zhang et al., Knowledge Base System, Modern CAPP Technology and Applications, Oct. 31, 2003, pp. 71-75, Northwestern Polytechnical University Press.

Extended European Search Report of Counterpart European Patent Application No. 22913454.9 issued on May 15, 2025.

* cited by examiner

AUDIO AND VIDEO SYNCHRONIZATION METHOD AND DEVICE, ELECTRONIC DEVICE, AND COMPUTER READABLE STORAGE MEDIUM

CROSS-REFERENCE TO RELATED APPLICATIONS

This application is a continuation of International Application No. PCT/CN2022/115903 entitled "AUDIO AND VIDEO SYNCHRONIZATION METHOD AND DEVICE, ELECTRONIC DEVICE, AND COMPUTER READABLE STORAGE MEDIUM" filed on Aug. 30, 2022, which claims priority to Chinese Patent Application No. 202111677757.0, entitled "AUDIO AND VIDEO SYNCHRONIZATION METHOD AND DEVICE, ELECTRONIC DEVICE, AND COMPUTER READABLE STORAGE MEDIUM" filed with CNIPA on Dec. 31, 2021, all of which are incorporated herein by reference in their entireties.

TECHNICAL FIELD

The present disclosure relates to the technical field of multimedium, more particularly to, an audio and video synchronization method for a playback module, an audio and video synchronization device for a playback module, an electronic device and a computer readable storage medium.

BACKGROUND

Digital Televisions (DTVs) and Internet Protocol Televisions (IPTVs) are common audio-visual systems. Audio and video synchronization is an important aspect that affects the product quality and user experience of audiovisual systems.

However, in practical applications, the synchronization mechanism used by audiovisual systems such as DTV and IPTV products has some shortcomings. For example, it is difficult to support multiple-channel broadcasting synchronization, can not support cross-process audio and video synchronization. The synchronization mechanism is tightly associated with a player, is difficult to transplant, and can not be used flexibly.

SUMMARY

The present disclosure aims to solve at least the technical problem existing in the prior art. For this purpose, a first purpose of the present disclosure is to propose an audio and video synchronization method, which can realize multi-channel play synchronization and support cross-process audio and video synchronization, and the synchronization mechanism is easier to transplant and more flexible.

A second purpose of the present disclosure is to propose an audio and video synchronization device.

A third purpose of the present disclosure is to propose an electronic device.

A fourth purpose of the present disclosure is to propose a computer readable storage medium.

In order to achieve the above purposes, an audio and video synchronization method for a playback module is provided according to an embodiment in a first aspect of the present disclosure. The playback module includes an object-oriented program language standard library and a kernel driver. The audio and video synchronization method includes: determining, in response to a playback instruction, a target player to build an audio module and a video module from the target player; creating, in the program language standard library, a synchronization instance corresponding to the target player, the synchronization instance having a unique instance identifier; and obtaining a reference clock corresponding to the synchronization instance based on the instance identifier, and controlling data outputs of the audio module and the video module corresponding to the target player based on the reference clock.

According to the embodiment of the present disclosure, the audio and video synchronization method for the playback module adopts the object-oriented design idea, carries out synchronization processing through the instance and the instance identifier, can support multiple-channel playback and cross-process synchronization scene. The audio and video synchronization module adopts the form of the program language standard library and the kernel driver, therefore any player or module can achieve audio and video synchronization by compiling the program language standard library and calling a related synchronization method of the program language standard library, thereby achieving strong portability and more flexible usage scenarios.

In order to achieve the above purposes, an audio and video synchronization device for a playback module is provided according to an embodiment in a second aspect of the present disclosure. The audio and video synchronization device for a playback a module, includes: a building block configured to determine a target player in response to a playback instruction to build an audio module and a video module from the target player; a program language standard library configured to create a synchronization instance corresponding to the target player, the synchronization instance having a unique instance identifier; and a kernel driver configured to obtain a reference clock corresponding to the synchronization instance based on the instance identifier, and to control data outputs of the audio module and the video module corresponding to the target player based on the reference clock.

According to the embodiment of the present disclosure, the audio and video synchronization device for the playback module adopts the object-oriented design idea, carries out synchronization processing through the instance and the instance identifier, can support multiple-channel playback and cross-process synchronization scene, adopts the form of the program language standard library and the kernel driver, therefore any player or module can achieve audio and video synchronization by compiling the program language standard library and calling a related synchronization method of the program language standard library, thereby achieving strong portability and more flexible usage scenarios.

In order to achieve the above purposes, an electronic device is provided according to an embodiment in a third aspect of the present disclosure. The electronic device includes: a processor; and a memory in communication connection with the processor. The memory stores a computer program that is executable by the processor. The processor, when executing the computer program, implements the audio and video synchronization method for the playback module.

According to the embodiment of the present disclosure, the electronic device, by performing the audio and video synchronization method for the playback module by its processor according to the above embodiment, can support multiple-channel playback and cross-process synchronization scene, adopts the form of the program language standard library and the kernel driver to achieve synchronous processing, therefore any player or module can achieve audio and video synchronization by compiling the program language standard library and calling a related synchronization method of the program language standard library, thereby achieving strong portability and more flexible usage scenarios.

In order to achieve the above purposes, a computer readable storage medium is provided according to an embodiment in a fourth aspect of the present disclosure. The computer readable storage medium stores a computer program thereon. The computer program, when executed by a processor, implements the audio and video synchronization method for the playback module.

According to the embodiment of the present disclosure, the computer readable storage medium stores the computer program medium thereon, and the computer program, when executed, implements the audio and video synchronization method for the playback module according to the embodiment in the first aspect of the present disclosure. The audio and video synchronization method for the playback module adopts the object-oriented design idea, carries out synchronization processing through the instance and the instance identifier, can support multiple-channel playback and cross-process synchronization scene. The synchronous processing adopts the form of the program language standard library and the kernel driver, therefore any player or module can achieve audio and video synchronization by compiling the program language standard library and calling a related synchronization method of the program language standard library, thereby achieving strong portability and more flexible usage scenarios.

Additional aspects and benefits of the present disclosure will be given partially in the description below, and partially will be obvious from the description below, or will be understood through the practice of the present disclosure.

BRIEF DESCRIPTION OF DRAWINGS

The above and/or additional aspects and advantages of the present disclosure will become apparent and easy to understand from the description of embodiments in conjunction with the accompanying drawings, in which.

DESCRIPTION OF EMBODIMENTS

Figure 1:
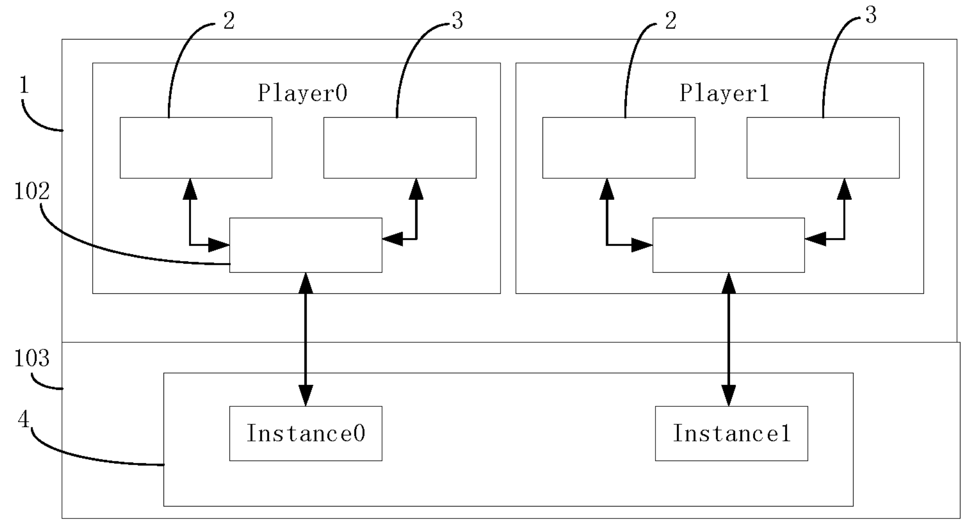
FIG. 1 is a schematic diagram showing realization of multi-channel audio and video play synchronization according to an embodiment of the present disclosure.

In order to make the purposes, technical solutions and advantages of the present disclosure more clear, the present disclosure will be described in detail below with reference to the attached drawings and embodiments. It should be understood that the specific embodiments described herein are intended only to interpret the present disclosure and are not intended to limit the present disclosure.

An audio and video synchronization method for a playback module according to an embodiment of the present disclosure adopts the object-oriented design idea and program language, can support multiple-channel play synchronization, and can also realize cross-process synchronization. The synchronization module is less coupling with the player, is easier to transplant, and is more flexible in use.

The object-oriented design is a software development method, i.e., a programming paradigm. In the object-oriented programming, the term "object" refers to a certain component of a computer system. An object can contain two meanings, one is data, the other is action. An object is a combination of data and action. An object can not only perform operations, but also record operation results in time. A method is an operation that an object can perform. A method also has another name, called a function. A method is a defined function in a class and its specific function is to describe an object.

In the embodiments of the present disclosure, the playback module may be a chipset or an audio and video playback product such as a television set, etc. The playback module adopts the form of an object-oriented program language standard (such as C++ library) and a kernel driver. In the program language standard such as C++ library, a synchronization instance is created, is an object in the object-oriented program, takes audio and video as objects and further includes a method in which the audio and video are taken as objects. The kernel driver saves core synchronization data, and the program language standard library interacts with the kernel driver to obtain the required core synchronization data for audio and video synchronization processing. In some embodiments, the playback module may be a plug-in, a software package or a program library.

An audio and video synchronization method for a playback module according to an embodiment of the present disclosure will be described with reference to FIGS. 1 and 2.

The audio and video synchronization method for the playback module according to the embodiment of the present disclosure includes at least the following steps S1-S4 which are described as follows.

At step S1, a target player is determined in response to a playback instruction to build an audio module and a video module from the target player.

In an embodiment, a user can input a playback instruction using a remote controller or a touchpad. The playback instruction can be a single-channel playback instruction, such as an instruction to turn on a certain video. Alternatively, the playback instruction can be a multi-channel playback instruction, such as an instruction to turn on multiple playback pictures, e.g., picture in picture during TV playback.

In an embodiment, there may be multiple idle playback channels, that is, players that are not currently in a playback state. After receiving the playback instruction, a kernel driver can use one or more idle players to play audio and video, that is, using the one or more idle players as the target player(s).

Specifically, the target player builds an audio stream running thread as an audio module, and a video stream running thread as a video module.

At step S2, a synchronization instance corresponding to the target player is created in the program language standard library.

The synchronization instance is a concept in object-oriented programming, i.e., an object, and has a unique instance identifier, that is, instance id.

In an embodiment, the kernel driver is configured with a table for managing synchronization instances, which can be called as an instance management table in the present disclosure. When a synchronization instance is created in the program language standard library such as C++ library, the kernel driver creates a node (node) in the instance management table for management, where the instance identifier is identified as a unique identifier. All operations of methods in the C++ library take the instance identifier as a parameter corresponding to the node of the instance in the kernel driver.

Specifically, an instance in which the audio module and the video module in the target player are used as objects and an instance of an operation method of the objects is created in the program language standard library such as C++ library. Here, the audio module and the video module can be present in a single process or across processes.

At step S3, a reference clock corresponding to the synchronization instance is obtained based on the instance identifier, and data outputs of the audio module and the video module corresponding to the target player are controlled based on the reference clock.

Here, the kernel driver can identify the target player based on the instance identifier, that is, identify players for playing audio and video, or that is, identify an instance that is needed to be managed. In the embodiment, the audio and video synchronization method in the embodiment of the present disclosure can support a variety of synchronization modes, such as video master mode, audio master mode, program clock reference (pcr) master mode, free run and other basic synchronization modes.

In an embodiment of the present disclosure, the reference clock may be a program reference clock for a real-time code stream or a system reference clock. The program reference clock for the real-time code stream can include a display timestamp of audio and video, an audio timestamp, etc. Some real-time code streams include a program reference clock, while some real-time code streams do not include a program reference clock. Therefore, if the real-time code stream includes a program reference clock, the program reference clock for the real-time code stream corresponding to the synchronization instance can be obtained based on the instance identifier. If the real-time code stream does not include a program reference clock, the system reference clock corresponding to the synchronization instance can be obtained.

Specifically, the kernel driver can obtain the program reference clock for the real-time code stream from demux or direct input of the third-party, including the program reference clock corresponding to the code stream of each target player, and identifies the target player based on the instance identifier and identifies the synchronization instance corresponding to the target player, so as to obtain the program reference clock or system reference clock of the real-time code stream corresponding to the synchronization instance and the audio and video timestamps. In the embodiment of the present disclosure, the playback time of the audio and video is related to its timestamp and reference clock. In addition, with reference to the playback time of the audio and video, a synchronization mode is considered, that is, the playback time of the audio and video is adjusted according to different synchronization modes. When programming is performed, the synchronization mode can be set according to the needs. That is, the data output timings of the audio module and the video module corresponding to the target player can be controlled based on the set synchronization mode, so as to cause the audio and video played by each target player to be synchronized.

In some embodiments, for each single-channel playback of multi-channel playback, the audio module and the video module of each single-channel player are controlled according to any of the above embodiments so as to perform simultaneous play, so that the audio and video synchronization effect of each single-channel player can be achieved.

FIG. 1 is a schematic diagram of a two-channel playback synchronization method according to an embodiment of the present disclosure. As shown in FIG. 1, user end 1 sends a two-channel playback instruction, such as determining player0 and player1 as target players, and each single-channel player builds an audio thread and a video thread, i.e., an audio module and a video module. An audio module 2 and a video module 3 of each player interact with a corresponding instance node in a kernel driver 103 by calling a method of a synchronization instance of the program language standard library 102, such as the C++ library. A medium synchronization driver 4 of the kernel driver 103 determines, based on an instance identifier such as instance0 and instance1, a player to which a synchronization instance belongs so as to obtain synchronization data, namely a program reference clock or a system reference clock of code stream data corresponding to the audio and video. Then, according to a set synchronization mode, the data output timings of the audio modules and the video modules corresponding to player0 and player1 are controlled based on the corresponding reference clock, so as to realize the simultaneous playback of audio and video in player0 and player1. That is, the audio and video synchronization method of the embodiment in the present disclosure is applicable to the audio and video synchronization of the multi-channel playback scenario.

In some other embodiments, the audio module and the video module across processes can also be processed synchronously by using the synchronization instance of the program language standard library such as C++ library and the instance identifier thereof in any of the above embodiments, so as to achieve the purpose of audio and video synchronization.

Therefore, according to the embodiment of the present disclosure, the audio and video synchronization method for the playback module adopts the object-oriented design idea, carries out synchronization processing through the instance and the instance identifier, can support multiple-channel playback and cross-process synchronization scene. The synchronization module adopts the form of program language standard library and kernel driver, therefore any player or module can achieve audio and video synchronization by compiling the program language standard library and calling the related synchronization methods of the program language standard library, thereby achieving strong portability and more flexible usage scenarios.

Figure 2:
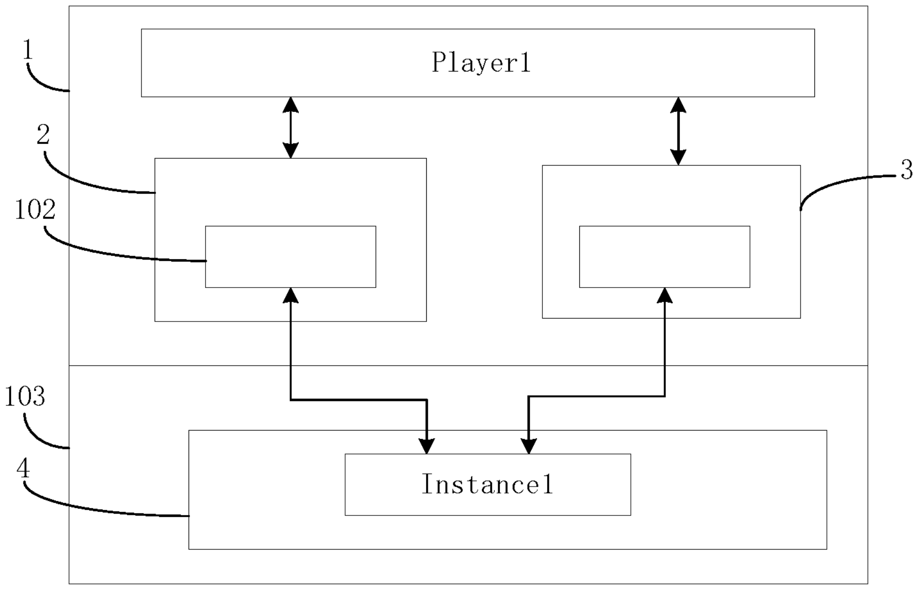
FIG. 2 is a schematic diagram of cross-process audio and video synchronization according to an embodiment of the present disclosure.

In some embodiments, FIG. 2 is a schematic diagram of cross-process audio and video synchronization according to an embodiment of the present disclosure. An audio module 2 and a video module 3 of a target player belong to different processes. Core synchronization data is stored in the kernel driver 103. The program language standard library 102, such as the C++ library, can use ioctl (input/output control) to interact with the kernel driver to obtain core synchronization data. The program language standard library 102 can perform correct synchronization processing based on the obtained synchronization data so as to achieve cross-process audio and video synchronization. In the computer field, ioctl is a system call dedicated to device input and output operations, and the system call introduces a device-related request code such as instance identifier. Specifically, user end 1 sends a playback instruction, and player 1 is a target player, and player 1 constructs the audio module 2 and the video module 3 across different processes. The audio module 2 and the video module 3 respectively obtain synchronization data for corresponding synchronization instances in the kernel driver 103 by calling a synchronization method in the program language standard library 102, such as a reference clock for code stream data. The kernel driver 103 can identify the synchronization data of the corresponding synchronization instance such as instance1 based on the instance identifier, and then control the data output timings of the audio module 2 and the video module 3 in the corresponding player1 based on the set synchronization mode and the reference clock, so as to realize the synchronous playback of the audio and video in player1. Therefore, the audio and video synchronization method according to the embodiment of the present disclosure is based on the program language standard library 102 (such as C++ library) and the kern-driven audio and video synchronization module, and can realize the synchronization of audio and video across processes through the synchronization instance and the instance identifier.

Several synchronization modes used in embodiments of the present disclosure will be explained below. During program design, the synchronization mode can be set according to specific applications and requirements.

In some embodiments, the set synchronization mode includes a clock master mode which can be used in a case in which the real-time code stream includes the program reference clock. In clock master mode, the kernel driver can identify a single-channel player to which the target player belongs based on the instance identifier, so as to obtain the synchronization data of the corresponding synchronization instance. The kernel driver obtains the audio timestamp sent by the audio module in the target player calling a method in the program language standard library such as C++ library, and obtains the program reference information of the real-time code stream of the corresponding synchronization instance of the target player, and controls the audio data output of the audio module based on the audio timestamp and the program reference clock. For example, if the audio timestamp is less than or equal to the time of the program reference clock, the audio module is controlled to output audio, On the contrary, the audio module will not output audio data.

For example, the C++ library is taken as an example of the program language standard library. The kernel driver obtains clock information PCR (program clock reference) of the real-time code stream from the hardware demux. The audio module sends the PTS (Presentation Time Stamp) corresponding to the audio pcm data of the audio module to the C++ library by calling the synchronization method in the C++ library. The C++ library obtains the PCR corresponding to the instance from the kernel driver, determines, based on the PCR, whether the audio pcm (Pulse Code Modulation) data packet is to be output. For example, if the PTS corresponding to the audio pcm data is less than or equal to the PCR of the corresponding instance, the audio pcm data packet is determined to be output. Otherwise, the audio pcm data packet is determined not to be output.

The case of the video playback of the video module is similar as the output of the audio module as above. Specifically, the kernel driver obtains a display timestamp sent by the video module in the target player calling the program language standard library, and obtains the program reference clock for the real-time code stream of the synchronization instance corresponding to the target player. The kernel driver controls video frame output of the video module based on the display timestamp and the program reference clock.

For example, the video module sends PTS corresponding to the video frame data of the video module to the C++ library by calling the synchronization method in the C++ library. The C++ library obtains the PCR of the corresponding instance from the kernel driver, and determines whether the video frame data packet is to be output based on the PCR. For example, if the PTS corresponding to the video frame data is less than or equal to the PCR of the corresponding instance, the video frame data packet is to be output; otherwise, the video frame data packet is not to be output.

In short, in the clock master mode, the audio and video synchronisation can be achieved by taking the program reference clock of the corresponding synchronization instance of the target player as a reference, and making the audio module and the video module to be synchronized with a clock of the corresponding synchronization instance.

In some embodiments, the set synchronization module includes an audio master mode, which can be used when the code stream does not contain a program reference clock.

In the audio master mode, time when data of the audio module is output is used as a reference, and is synchronized with time when data of the video module is output. Specifically, the kernel driver is configured to control the audio module to output at its own sampling rate, identify a single channel player to which the target player belongs based on the instance identifier, obtain an audio timestamp sent by the audio module in the target player calling a method in the program language standard library such as C++ library, determine the audio timestamp as synchronization anchor time of the corresponding synchronization instance of the target player, obtain the system reference clock for the corresponding synchronization instance, and control video frame output of the video module in the target player based on the synchronization anchor time and the system reference clock.

For example, the audio module performs a normal output, i.e., the audio module outputs data according to its own sampling rate. At the same time, by calling a method in the C++ library, the audio module sends PTS currently output by the corresponding audio module to the corresponding instance node of the kernel driver through the C++ library, and determines the PTS as the synchronous anchor time. The video module obtains the synchronization anchor time information of the instance corresponding to the kernel driver through the method of C++ library, decides output time and strategy of the current video frame, so as to realize the synchronous output of the video module and the audio module. For example, system reference clocks corresponding respectively to audio timestamps of two adjacent frames are determined so as to obtain a system reference clock deviation, time when a next audio frame is played (that is, time when the upcoming audio is played) is determined based on the synchronization anchor time and the system reference clock deviation, and the video frame output is controlled at the time point corresponding to the time when the upcoming audio is played, so as to achieve audio and video synchronization output.

In some embodiments, the set synchronization mode includes a video master mode, which can be used when the code stream does not include the program reference clock.

In the video master mode, time when data of the video module is output is used as a reference, and is synchronized with time when data of the audio module is output. Specifically, the kernel driver is configured to control the video module to output at its own frame rate, identify a single channel player to which the target player belongs based on the instance identifier, obtain a display timestamp sent by the video module in the target player calling a method in the program language standard library, determine the display timestamp as synchronization anchor time of the corresponding synchronization instance of the target player, and control audio data output of the audio module in the target player based on the synchronization anchor time and the system reference clock. For example, system reference clocks corresponding respectively to video timestamps of two adjacent frames are determined so as to obtain a system reference clock deviation, time when a next video frame is played (that is, the time when an upcoming video is played) is determined based on the synchronization anchor time and the system reference clock deviation, and the audio frame output is controlled at the time point corresponding to the time when the upcoming video is played to achieve audio and video synchronization output.

For example, the video module performs a normal output, i.e., the video module outputs data according to its own frame rate. At the same time, by calling a method in the C++ library, the video module sends PTS currently output by the corresponding video module to the corresponding instance node of the kernel driver through the C++ library, and determines the PTS as the synchronous anchor time. The audio module obtains the synchronization anchor time information of the instance corresponding to the kernel driver through calling the method of C++ library, so as to decide output time and strategy of pcm data of the current audio frame, so as to realize the synchronous output of the video module and the audio module.

In embodiments of the present disclosure, the audio and video synchronization method for the playback module according to the embodiments of the present disclosure can be used for the audio and video synchronization of at least one of multiplier speed playback, dead slow playback, display frame rate control, frame loss, and drop pcm. In other words, the audio and video synchronization method for the playback module in the embodiments of the present disclosure performs synchronous processing via the synchronization instance and the instance identifier based on the program language standard library such as a C++ library and the kernel driver, and thus it is suitable for any scenario of multiplier speed playback, dead slow playback, display frame rate control, frame loss, and drop pcm, and can achieve the purpose of audio and video synchronization. That is, the audio and video synchronization method of the present disclosure can fully cover the core synchronization mechanism, so that the synchronization module can be flexibly used as an independent module for various products and scenarios.

Based on the audio and video synchronization method of any of the above embodiments, an audio and video synchronization device for the playback module according to an embodiment in a second aspect of the present disclosure will be described below with reference to the attached drawings.

Figure 3:
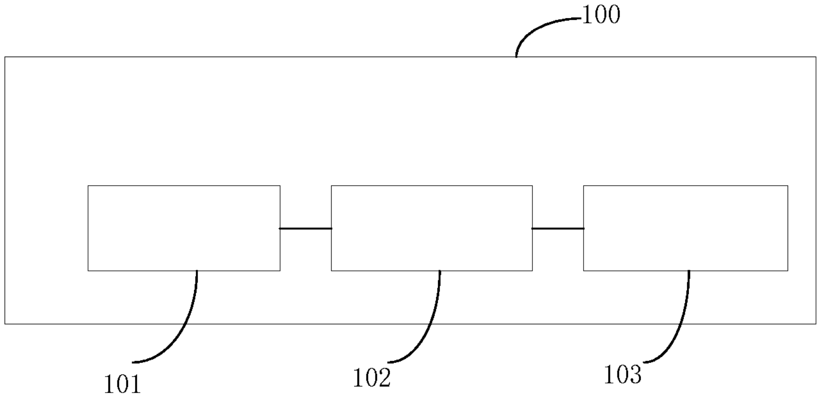
FIG. 3 is a block diagram of an audio and video synchronization device for a playback module according to an embodiment of the present disclosure.

FIG. 3 is a block diagram of an audio and video synchronization device according to an embodiment of the present disclosure. As shown in FIG. 3, the audio and video synchronization device 100 according to the embodiment of the present disclosure includes a building module 101, a program language standard library 102, and a kernel driver 103.

The building module 101 is configured to determine a target player in response to a playback instruction to build an audio module and a video module from the target player. The program language standard library 102 is configured to create a synchronization instance corresponding to the target player, the synchronization instance having a unique instance identifier. The kernel driver 103 is configured to obtain a reference clock corresponding to the synchronization instance based on the instance identifier, and to control data outputs of the audio module and the video module corresponding to the target player based on the reference clock. In some embodiments, the reference clock can be a program reference clock or a system reference clock for a real-time stream.

According to the embodiment of the present disclosure, the audio and video synchronization device 100 for the playback module adopts the object-oriented design idea, carries out synchronization processing through the instance and the instance identifier, can support multiple-channel playback and cross-process synchronization scene. The audio and video synchronization device 100 adopts the form of program language standard library 102 and kernel driver 103, therefore any player or module can achieve audio and video synchronization by compiling the program language standard library 102 and calling the related synchronization methods of the program language standard library 102, thereby achieving strong portability and more flexible usage scenarios.

In some embodiments, the audio module and the video module of the target player belong to different processes, and the program language standard library 102 can use ioctl to interact with the kernel driver 103 to achieve audio and video synchronization across processes.

In some embodiments, the set synchronization mode includes a clock master control mode. The kernel driver 103 is further configured to: identify the target player based on the instance identifier; obtain an audio timestamp sent by the audio module in the target player calling a method in the program language standard library 102 such as the C++ library, and obtain the program reference clock for the real-time code stream of the synchronization instance corresponding to the target player; and control audio data output of the audio module based on the audio timestamp and the program reference clock.

In some embodiments, the kernel driver 103 is further configured to obtain an display timestamp sent by the video module in the target player calling a method in the program language standard library 102 such as the C++ library, and obtain the program reference clock for the real-time code stream of the synchronization instance corresponding to the target player; and control video frame output of the video module based on the display timestamp and the program reference clock.

In some embodiments, the set synchronization mode includes the audio master mode. The kernel driver 103 is configured to: control the audio module to output at its own sampling rate; identify the target player based on the instance identifier; obtain an audio timestamp sent by the audio module in the target player calling a method in the program language standard library 102 such as C++ library, determine the audio timestamp as synchronization anchor time of the corresponding synchronization instance of the target player; and obtain the system reference clock for the corresponding synchronization instance; and control video frame output of the video module in the target player based on the synchronization anchor time and the system reference clock.

In some embodiments, the set synchronization mode includes a video master mode. The kernel driver 103 is configured to control the video module to output at its own frame rate; identify the target player based on the instance identifier; obtain a display timestamp sent by the video module in the target player calling a method in the program language standard library 102 such as C++ library; determine the display timestamp as synchronization anchor time of the corresponding synchronization instance of the target player; and obtain the system reference clock for the corresponding synchronization instance; and control audio data output of the audio module in the target player based on the synchronization anchor time and the system reference clock.

In some embodiments, the audio and video synchronization device 100 includes at least one of the audio and video synchronization mechanisms for multiplier speed playback, dead slow playback, display frame rate control, frame loss, and drop pcm, and can be used as an independent device.

Figure 4:
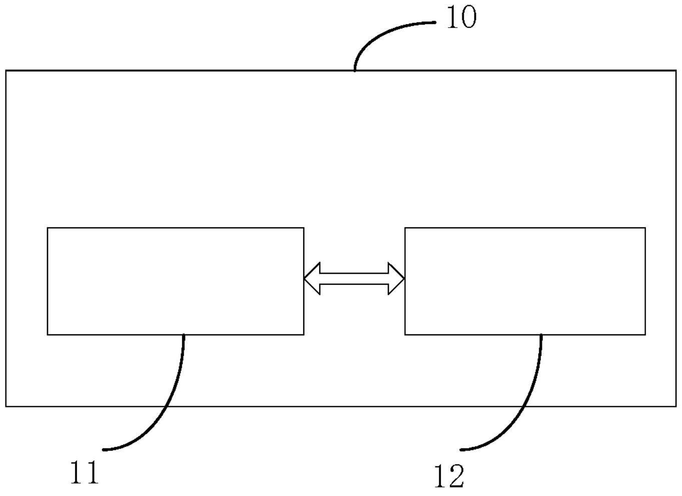
FIG. 4 is a block diagram of an electronic device according to an embodiment of the present disclosure.

FIG. 4 is a block diagram of an electronic device according to an embodiment of the present disclosure. As shown in FIG. 4, the electronic device 10 includes a processor 11 and a memory 12 which is in communication connection with the processor 11.

In an embodiment, the electronic device 10 may include a digital television, an interactive network television, or other devices that can adopt the audio and video synchronization method according to any of the above embodiments of the present disclosure.

The memory 12 stores a computer program that can be executed by the processor 11. The processor 11, when executing the computer program, implements the audio and video synchronization method according to any of the above embodiments.

The electronic device 10 according to the embodiment of the present disclosure adopts the processor 11 to implement the audio and video synchronization method for the playback module according to any of the above embodiments, and thus can support the multi-channel playback and cross-process synchronization scene. The synchronous processing adopts the form of the program language standard library such as C++ library and the kernel driver, therefore any player or module can achieve audio and video synchronization by compiling the program language standard library and calling synchronization methods related to the programming language standard library, thereby achieving strong portability and more flexible usage scenarios.

In an embodiment of the fourth aspect of the present disclosure, a computer-readable storage medium on which a computer program is stored is provided. The computer program, when executed by the processor, implements the audio and video synchronization method according to any of the above embodiments. Regarding the audio and video synchronization method, reference may be made to the description of the embodiments in the first aspect above and details are omitted here.

According to the embodiment of the present disclosure, the computer readable storage medium stores the computer program medium, the computer program when executed implements the audio and video synchronization method according to the embodiment in the first aspect of the present disclosure. The method adopts the object-oriented design idea, carries out synchronization processing using the instance and the instance identifier, and thus can support multi-channel playback and cross-process synchronization scene. The synchronization processing adopts the form of program language standard libraries such as C++ libraries and the kernel driver, and any player or module can achieve audio and video synchronization by compiling the program language standard library and calling synchronization methods related to program language standard library, thereby achieving strong portability and more flexible usage scenarios.

A person of ordinary skill in the art may understand that all or part of the process in the method according to any of the above embodiments may be accomplished via instructing the relevant hardware by a computer program. The computer program may be stored in a non-transitory computer readable storage medium. The computer program, when executed, may implement a process of the method in any of the above embodiments. Any reference to a memory, a database, or other medium used in any of the embodiments provided in the disclosure can include at least one of a non-transitory memory and a transitory memory. The Non-transitory memory may include a Read-Only memory (ROM), a magnetic tape, a floppy disk, a flash memory, or an optical memory. The transitory memory can include a Random Access Memory (RAM) or an external cache memory. As an illustration rather than a limitation, RAM is available in various forms, such as a Static Random Access Memory (SRAM) and a Dynamic Random Access Memory (DRAM).

The various technical features of the above embodiments can be combined arbitrarily. To make the description concise, not all possible combinations of individual technical features in the above embodiments have been described. However, as long as there is no contradiction in the combination of these technical features, they should be considered as falling within the scope of this description.

In the description of the present disclosure, the description with reference to the terms “an embodiment”, “some embodiments”, “illustrative embodiments”, “examples”, “specific examples”, or “some examples” indicates that the specific features, structures, materials, or features described in conjunction with the embodiment(s) or example(s) are included in at least one embodiment or example of the present disclosure. In this description, the schematic representations of the above terms do not necessarily refer to the same embodiment or example.

While embodiments of the present disclosure have been shown and described, it will be understood by those of ordinary skill in the art that various changes, modifications, substitutions and variations can be made to the embodiments without departing from the principle and spirit of the present disclosure, the scope of which is defined by the claims and their equivalents.

What is claimed is:

1. An audio and video synchronization method for a playback module, the playback module comprising an object-oriented program language standard library and a kernel driver, the audio and video synchronization method comprising:

determining, in response to a playback instruction, a target player to build an audio module and a video module from the target player;

creating, in the program language standard library, a synchronization instance corresponding to the target player, the synchronization instance having a unique instance identifier, the kernel driver being configured with an instance management table, wherein when a synchronization instance is created in the program language standard library, the kernel driver creates a corresponding instance node in the instance management table for management; and obtaining, based on the instance management table, a reference clock corresponding to the synchronization instance based on the instance identifier, and controlling data outputs of the audio module and the video module corresponding to the target player based on the reference clock.

2. The audio and video synchronization method for the playback module according to claim 1, wherein the reference clock comprises a program reference clock for a real-time code stream, said obtaining the reference clock corresponding to the synchronization instance based on the instance identifier, and said controlling the data outputs of the audio module and the video module corresponding to the target player based on the reference clock, comprising:

determining, by the kernel driver, a set synchronization mode as a clock master mode;

identifying, by the kernel driver, the target player based on the instance identifier;

obtaining, by the kernel driver, an audio timestamp sent by the audio module in the target player calling a function in the program language standard library, and obtaining the program reference clock for the real-time code stream of the synchronization instance corresponding to the target player; and controlling, by the kernel driver, audio data output of the audio module based on the audio timestamp and the program reference clock.

3. The audio and video synchronization method for the playback module according to claim 2, further comprising:

obtaining, by the kernel driver, a display timestamp sent by the video module in the target player calling a function in the program language standard library, and obtaining the program reference clock for the real-time code stream of the synchronization instance corresponding to the target player; and controlling, by the kernel driver, video data output of the video module based on the display timestamp and the program reference clock.

4. The audio and video synchronization method for the playback module according to claim 1, wherein:

the reference clock comprises a system reference clock;

said obtaining the reference clock corresponding to the synchronization instance based on the instance identifier, and said controlling data outputs of the audio module and the video module corresponding to the target player based on the reference clock, comprise:

determining, by the kernel driver, a set synchronization mode as an audio master mode;

controlling, by the kernel driver, the audio module to output at its own sampling rate;

identifying, by the kernel driver, the target player based on the instance identifier;

obtaining, by the kernel driver, an audio timestamp sent by the audio module in the target player calling a function in a C++ library; determining, by the kernel driver, the audio timestamp as synchronization anchor time of the corresponding synchronization instance of the target player; and obtaining the system reference clock for the corresponding synchronization instance; and controlling, by the kernel driver, video frame output of the video module in the target player based on the synchronization anchor time and the system reference clock.

5. The audio and video synchronization method for the playback module according to claim 1, wherein the reference clock comprises a system reference clock;

said obtaining the reference clock corresponding to the synchronization instance based on the instance identifier, and said controlling the data outputs of the audio module and the video module corresponding to the target player based on the reference clock, comprise:

determining, by the kernel driver, a set synchronization mode as a video master mode;

controlling, by the kernel driver, the video module to output at its own frame rate;

identifying, by the kernel driver, the target player based on the instance identifier;

obtaining, by the kernel driver, a display timestamp sent by the video module in the target player calling a function in the program language standard library; determining, by the kernel driver, the display timestamp as synchronization anchor time of the corresponding synchronization instance of the target player; and obtaining, by the kernel driver, the system reference clock for the corresponding synchronization instance; and controlling, by the kernel driver, audio data output of the audio module in the target player based on the synchronization anchor time and the system reference clock.

6. The audio and video synchronization method for the playback module according to claim 1, wherein the audio and video synchronization method is used for audio and video synchronization of at least one of multiplier speed playback, dead slow playback, display frame rate control, frame loss, and drop pcm.

7. The audio and video synchronization method for the playback module according to claim 1, wherein the audio module and the video module of the target player belong to different processes, and the program language standard library uses ioctl to interact with the kernel driver.

8. An electronic device, comprising:

a processor; and a memory in communication connection with the processor;

wherein the memory stores a computer program that is executable by the processor, and the processor is configured to execute the computer program to:

determine, in response to a playback instruction, a target player to build an audio module and a video module from the target player;

create, in an object-oriented program language standard library, a synchronization instance corresponding to the target player, the synchronization instance having a unique instance identifier, a kernel driver being configured with an instance management table, wherein when a synchronization instance is created in the program language standard library, the kernel driver creates a corresponding instance node in the instance management table for management; and obtain, based on the instance management table, a reference clock corresponding to the synchronization instance based on the instance identifier, and control data outputs of the audio module and the video module corresponding to the target player based on the reference clock.

9. The electronic device according to claim 8, wherein the reference clock comprises a program reference clock for a real-time code stream, the processor is further configured to execute the computer program to:

determine a set synchronization mode as a clock master mode;

identify the target player based on the instance identifier;

obtain an audio timestamp sent by the audio module in the target player calling a function in the program language standard library, and obtain the program reference clock for the real-time code stream of the synchronization instance corresponding to the target player; and control audio data output of the audio module based on the audio timestamp and the program reference clock.

10. The electronic device according to claim 9, wherein the processor is further configured to execute the computer program to:

obtain a display timestamp sent by the video module in the target player calling a function in the program language standard library, and obtain the program reference clock for the real-time code stream of the synchronization instance corresponding to the target player; and control video data output of the video module based on the display timestamp and the program reference clock.

11. The electronic device according to claim 8, wherein:

the reference clock comprises a system reference clock;

the processor is further configured to execute the computer program to:

determine a set synchronization mode as an audio master mode;

control the audio module to output at its own sampling rate;

identify the target player based on the instance identifier;

obtain an audio timestamp sent by the audio module in the target player calling a function in a C++ library; determine the audio timestamp as synchronization anchor time of the corresponding synchronization instance of the target player; and obtain the system reference clock for the corresponding synchronization instance; and control video frame output of the video module in the target player based on the synchronization anchor time and the system reference clock.

12. The electronic device according to claim 8, wherein the reference clock comprises a system reference clock;

the processor is further configured to execute the computer program to:

determine a set synchronization mode as a video master mode;

control the video module to output at its own frame rate;

identify the target player based on the instance identifier;

obtain a display timestamp sent by the video module in the target player calling a function in the program language standard library; determine the display timestamp as synchronization anchor time of the corresponding synchronization instance of the target player; and obtain the system reference clock for the corresponding synchronization instance; and control audio data output of the audio module in the target player based on the synchronization anchor time and the system reference clock.

13. The electronic device according to claim 8, wherein the electronic device is used for audio and video synchronization of at least one of multiplier speed playback, dead slow playback, display frame rate control, frame loss, and drop pcm.

14. The electronic device according to claim 8, wherein the audio module and the video module of the target player belong to different processes, and the program language standard library uses ioctl to interact with a kernel driver.

15. A computer-readable storage medium on which a computer program is stored, wherein the computer program, when executed by a processor, implements operations of:

determining, in response to a playback instruction, a target player to build an audio module and a video module from the target player;

creating, in a program language standard library, a synchronization instance corresponding to the target player, the synchronization instance having a unique instance identifier, a kernel driver being configured with an instance management table, wherein when a synchronization instance is created in the program language standard library, the kernel driver creates a corresponding instance node in the instance management table for management; and obtaining, based on the instance management table, a reference clock corresponding to the synchronization instance based on the instance identifier, and controlling data outputs of the audio module and the video module corresponding to the target player based on the reference clock.

16. The computer-readable storage medium according to claim 15, wherein the reference clock comprises a program reference clock for a real-time code stream, said obtaining the reference clock corresponding to the synchronization instance based on the instance identifier, and said controlling the data outputs of the audio module and the video module corresponding to the target player based on the reference clock, comprising:

determining a set synchronization mode as a clock master mode;

identifying the target player based on the instance identifier;

obtaining an audio timestamp sent by the audio module in the target player calling a function in the program language standard library, and obtaining the program reference clock for the real-time code stream of the synchronization instance corresponding to the target player; and controlling audio data output of the audio module based on the audio timestamp and the program reference clock.

17. The computer-readable storage medium according to claim 16, wherein the computer program, when executed by a processor, further implements operations of:

obtaining a display timestamp sent by the video module in the target player calling a function in the program language standard library, and obtaining the program reference clock for the real-time code stream of the synchronization instance corresponding to the target player; and controlling video data output of the video module based on the display timestamp and the program reference clock.

18. The computer-readable storage medium according to claim 15, wherein:

the reference clock comprises a system reference clock;

said obtaining the reference clock corresponding to the synchronization instance based on the instance identifier, and said controlling data outputs of the audio module and the video module corresponding to the target player based on the reference clock, comprise:

determining a set synchronization mode as an audio master mode;

controlling the audio module to output at its own sampling rate;

identifying the target player based on the instance identifier;

obtaining an audio timestamp sent by the audio module in the target player calling a function in a C++ library; determining the audio timestamp as synchronization anchor time of the corresponding synchronization instance of the target player; and obtaining the system reference clock for the corresponding synchronization instance; and controlling video frame output of the video module in the target player based on the synchronization anchor time and the system reference clock.

19. The computer-readable storage medium according to claim 15, wherein the reference clock comprises a system reference clock;

said obtaining the reference clock corresponding to the synchronization instance based on the instance identifier, and said controlling the data outputs of the audio module and the video module corresponding to the target player based on the reference clock, comprise:

determining a set synchronization mode as a video master mode;

controlling the video module to output at its own frame rate;

identifying the target player based on the instance identifier;

obtaining a display timestamp sent by the video module in the target player calling a function in the program language standard library; determining the display timestamp as synchronization anchor time of the corresponding synchronization instance of the target player;

and obtaining the system reference clock for the corresponding synchronization instance; and controlling audio data output of the audio module in the target player based on the synchronization anchor time and the system reference clock.

20. The computer-readable storage medium according to claim 15, wherein the computer-readable storage medium is used for audio and video synchronization of at least one of multiplier speed playback, dead slow playback, display frame rate control, frame loss, and drop pcm.

* * * * *